United States Patent
Kawahara et al.

(10) Patent No.: US 10,069,159 B2
(45) Date of Patent: Sep. 4, 2018

(54) FUEL CELL SYSTEM

(71) Applicant: TOYOTA JIDOSHA KABUSHIKI KAISHA, Toyota-shi, Aichi (JP)

(72) Inventors: Shuya Kawahara, Gotenba (JP); Shigeki Hasegawa, Susono (JP); Keita Yamaue, Miyoshi (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 148 days.

(21) Appl. No.: 15/107,656

(22) PCT Filed: Nov. 4, 2014

(86) PCT No.: PCT/JP2014/079204
§ 371 (c)(1),
(2) Date: Jun. 23, 2016

(87) PCT Pub. No.: WO2015/098291
PCT Pub. Date: Jul. 2, 2015

(65) Prior Publication Data
US 2016/0315342 A1    Oct. 27, 2016

(30) Foreign Application Priority Data

Dec. 25, 2013  (JP) ................................ 2013-266968

(51) Int. Cl.
*H01M 8/04* (2016.01)
*H01M 8/04746* (2016.01)
(Continued)

(52) U.S. Cl.
CPC ... *H01M 8/04753* (2013.01); *H01M 8/04544* (2013.01); *H01M 8/04559* (2013.01);
(Continued)

(58) Field of Classification Search
CPC ......... H01M 8/04753; H01M 8/04544; H01M 8/04559; H01M 8/04634; H01M 8/04895; H01M 2008/1095
See application file for complete search history.

(56) References Cited

U.S. PATENT DOCUMENTS 6,592,934 B2 * 7/2003 Totsuka .................. H01M 4/86
427/115
6,746,793 B1 * 6/2004 Gyoten ............... H01M 4/8605
429/481

(Continued)

FOREIGN PATENT DOCUMENTS

JP        08167421 A  *  6/1996
JP     2002-141090 A     5/2002
(Continued)

OTHER PUBLICATIONS

J-Plat Pat Machine Translation of the detailed description of JP 08-167421A (Jun. 1996). (Year: 1996).*

*Primary Examiner* — Gregg Cantelmo
(74) *Attorney, Agent, or Firm* — Hunton Andrews Kurth LLP

(57) ABSTRACT

In order to make a power generation quantity of a cell for fuel cell increase in a short time when a drop in moistness of the cell causes the power generation quantity of the cell to decrease, a cathode of the cell includes a conductive material, catalyst, and ionomer which covers the conductive material and catalyst. If an output voltage value of the cell is lower than a predetermined threshold voltage value and an electrical resistance value of the cell is higher than a predetermined threshold resistance value, control for increasing an oxidizing gas amount which increases an amount of oxidizing gas sent to the cell is performed.

9 Claims, 17 Drawing Sheets

(51) Int. Cl.
*H01M 8/04537* (2016.01)
*H01M 8/04858* (2016.01)
*H01M 8/1018* (2016.01)

(52) U.S. Cl.
CPC ... *H01M 8/04634* (2013.01); *H01M 8/04895* (2013.01); *H01M 2008/1095* (2013.01)

(56) References Cited

U.S. PATENT DOCUMENTS

| | | |
|---|---|---|
| 2004/0166387 A1 | 8/2004 | Imamura et al. |
| 2012/0058404 A1 | 3/2012 | Ishikawa et al. |
| 2015/0004506 A1 | 1/2015 | Tomita et al. |

FOREIGN PATENT DOCUMENTS

| | | |
|---|---|---|
| JP | 2004-220794 A | 8/2004 |
| JP | 2004-265862 A | 9/2004 |
| JP | 2009-016272 A | 1/2009 |
| JP | 2011-029158 A | 2/2011 |
| JP | 2011-222176 A | 11/2011 |
| JP | 2012-089448 A | 5/2012 |
| JP | 2012-109182 A | 6/2012 |
| WO | 2013/105590 A1 | 7/2013 |

\* cited by examiner

FUEL CELL SYSTEM

CROSS-REFERENCE TO RELATED APPLICATIONS

This is a national phase application based on the PCT International Patent Application No. PCT/JP2014/079204 filed Nov. 4, 2014, claiming priority to Japanese Patent Application No. 2013-266968 filed Dec. 25, 2013, the entire contents of both of which are incorporated herein by reference.

TECHNICAL FIELD

The present invention relates to a fuel cell system.

BACKGROUND ART

A fuel cell system is known in the art, which system is provided with: a cell for fuel cell, which cell has a membrane electrode assembly which is provided with an electrolyte and a cathode and anode which are respectively arranged at two sides of the electrolyte and an oxidizing gas passage which feeds an oxidizing gas to the cathode; an oxidizing gas feed path which is connected to an inlet, of the oxidizing gas passage; and an oxidizing gas feeder which is arranged in the oxidizing gas feed path and feeds oxidizing gas to the cathode.

If moistness of a cell for fuel cell, in particular an electrolyte or electrodes, becomes lower, power generation quantity or efficiency of the cell is liable to become lower. Here, the moistness of the cell is expressed by an output current value of the cell. That is, as the moistness of the cell becomes lower, the output current value of the cell becomes smaller. On the other hand, when oxidizing gas is sent to the cell, the oxidizing gas which flows out from the cell or cathode off-gas carries off moisture from the cell. If the amount of oxidizing gas which is sent to the cell becomes smaller, the amount of moisture which is carried off from the cell becomes smaller.

Therefore, a fuel cell system is known in the art, in which the oxidizing gas feeder is controlled to reduce the amount of oxidizing gas which is sent to the cell if the output current value of the cell is smaller than a predetermined threshold current value (see PTL 1). As a result, the amount of moisture which is carried off by the cathode off-gas is decreased and therefore the moistness of the cell is gradually raised, that is, is restored.

CITATIONS LIST

Patent Literature

PTL 1: Japanese Patent Publication No. 2011-222176A

SUMMARY OF INVENTION

Technical Problem

However, PTL 1 merely suppresses carrying off of moisture from the cell. For this reason, there may be a problem that a long time is required for increasing or restoring the power generation quantity of the cell

Solution to Problem

According to the present invention, there is provided a fuel cell system comprising: a cell for fuel cell, the cell having a membrane electrode assembly provided with an electrolyte and a cathode and anode respectively arranged at two sides of the electrolyte and an oxidizing gas passage configured to feed an oxidizing gas to the cathode; an oxidizing gas feed path connected to an inlet of the oxidizing gas passage; and an oxidizing gas feeder arranged in the oxidizing gas feed path and configured to feed oxidizing gas to the cathode, wherein the cathode includes a conductive material, catalyst, and ionomer which covers the conductive material and catalyst, and wherein, if an output voltage value of the cell is lower than a predetermined threshold voltage value and an electrical resistance value of the cell is higher than a predetermined threshold resistance value, the oxidizing gas feeder is controlled to perform control for increasing an oxidizing gas amount which increases an amount of oxidizing gas sent to the cell.

Advantageous Effects of Invention

It is possible to make a power generation quantity of a cell for fuel cell increase in a short time when a drop in moistness of the cell causes the power generation quantity of the cell to decrease.

DESCRIPTION OF EMBODIMENTS

Figure 1:
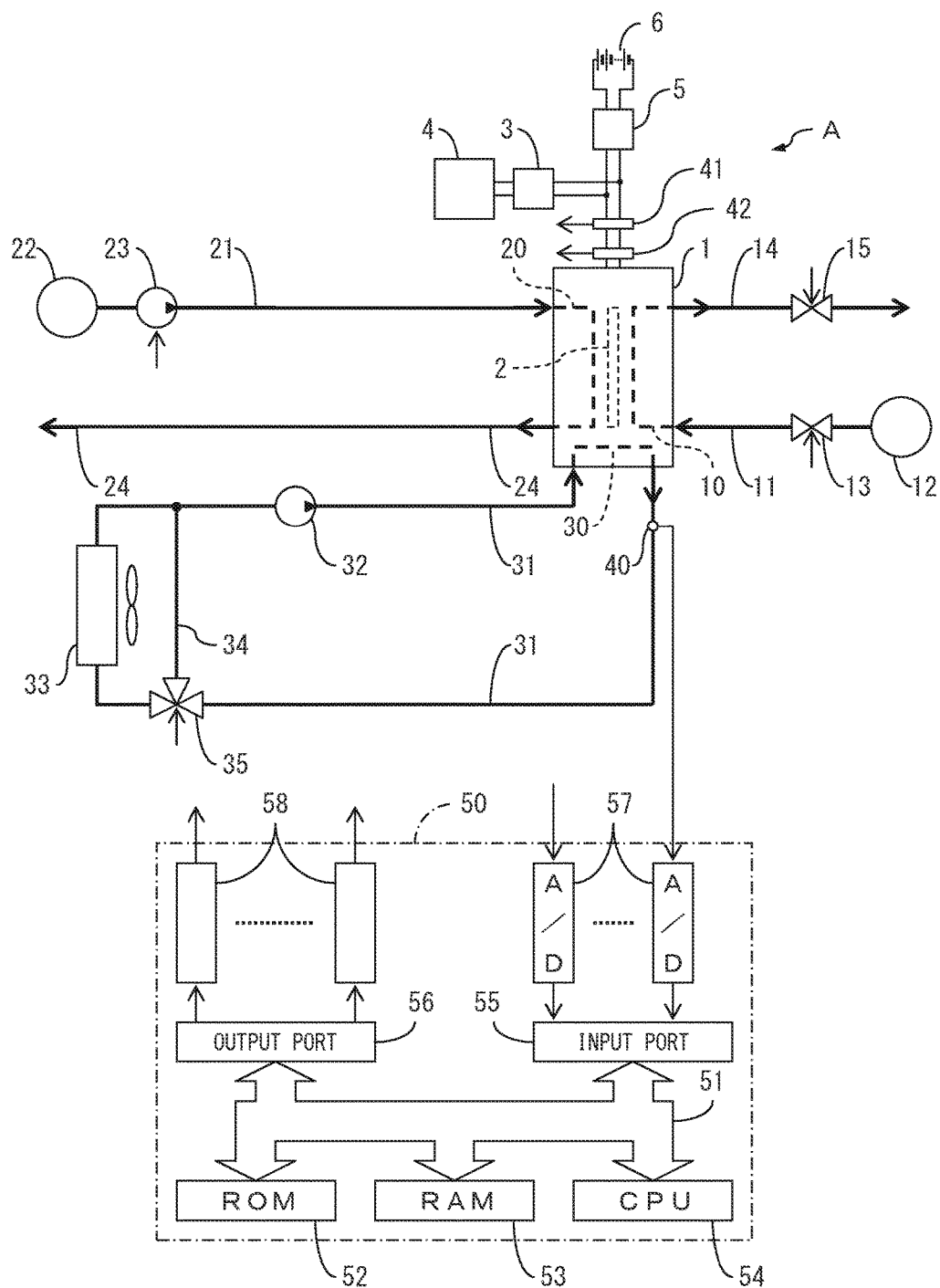
FIG. 1 is an overall view of a fuel cell system.
Figure 2:
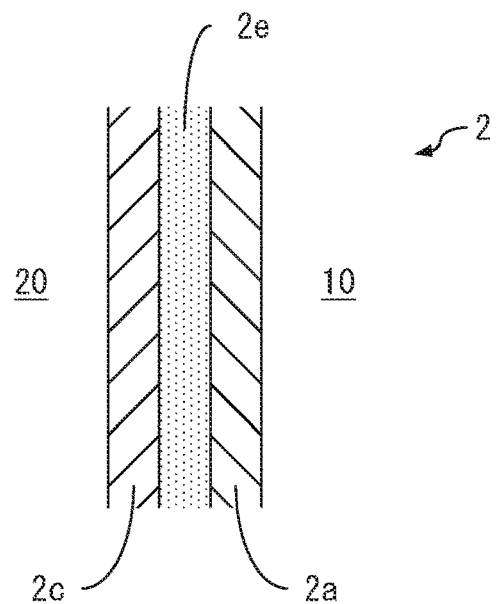
FIG. 2 is a partial enlarged cross-sectional view of a membrane electrode assembly.

Referring to FIG. 1, a fuel cell system A is provided with a cell 1 for fuel cell. The cell 1 has a membrane electrode assembly 2. As shown in FIG. 2, the membrane electrode assembly 2 is provided with a membrane-like electrolyte 2e, an anode 2a which is formed at one side of the electrolyte 2e, and a cathode 2c which is formed at the other side of the electrolyte 2e. The anode 2a and cathode 2c, as shown in FIG. 1, are electrically connected through an DC/AC converter 3 to for example an electric motor 4 for driving a vehicle on one hand, and are electrically connected through an AC/AC converter 5 to an electric accumulator 6 on the other hand. In the fuel cell system A which is shown in FIG. 1, the electric accumulator 6 is comprised of a battery. Further, as shown in FIG. 1 and FIG. 2, inside the cell 1, a fuel gas passage 10 for feeding fuel gas to the anode 2a and an oxidizing gas passage 20 which feeds oxidizing gas to the cathode 2c are formed. Inside the cell 1, further, the cell 1 is formed with a cooling water passage 30 for feeding cooling water to the cell 1.

Note that, the fuel cell system A which is shown in FIG. 1 is provided with a plurality of cells 1. These cells 1 are stacked in series with each other to form a fuel cell stack. In this case, the above-mentioned fuel gas passages 10, oxidizing gas passages 20, and cooling water passages 30 are respectively connected with each other.

At an inlet of the fuel gas passage 10, a fuel gas feed path 11 is connected. The fuel gas feed path 11 is connected to a fuel gas source 12. In an embodiment according to the present invention, the fuel gas is comprised of hydrogen and the fuel gas source 12 is comprised of a hydrogen tank. Inside the fuel gas feed path 11, a fuel gas control valve 13 which controls an amount of fuel gas which flows through the inside of the fuel gas feed path 11 is arranged. On the other hand, at an outlet of the fuel gas passage 10, an anode off-gas passage 14 is connected. Inside the anode off-gas passage 14, an anode off-gas control valve 15 which controls an amount of anode off-gas which flows through the inside of the anode off-gas passage 14 is arranged. When the fuel gas control valve 13 is opened, fuel gas inside the fuel gas source 12 is fed through the fuel gas feed path 11 to the inside of the cell 1. At this time, a gas which flows out from the fuel gas passage 10, that is, an anode off-gas, flows to the inside of the anode off-gas passage 14.

Further, at an inlet of the oxidizing gas passage 20, an oxidizing gas feed path 21 is connected. The oxidizing gas feed path 21 is connected to an oxidizing gas source 22. In the embodiment according to the present invention, the oxidizing gas is comprised of air and the oxidizing gas source 22 is comprised of the atmosphere. Inside the oxidizing gas feed path 21, an oxidizing gas feeder or compressor 23 which pumps out the oxidizing gas is arranged. On the other hand, at an outlet of the oxidizing gas passage 20, a cathode off-gas passage 24 is connected. When the compressor 23 is driven, the oxidizing gas inside the oxidizing gas source 22 is fed through the oxidizing gas feed path 21 to the oxidizing gas passage 20 inside the cell 1. At this time, a gas which flows out from the oxidizing gas passage 20, that is, a cathode off-gas, flows into the cathode off-gas passage 24.

In the embodiment which is shown in FIG. 1, the cell 1 is comprised of a cell for fuel cell of an opposite flow type. That is, the inlet of the fuel gas passage 10 and the outlet of the oxidizing gas passage 20 adjoin each other, the outlet of the fuel gas passage 10 and inlet of the oxidizing gas passage 20 adjoin each other, and therefore the fuel gas and oxidizing gas flow inside the cell 1 substantially in parallel and in reverse directions to each other. In another embodiment, the cell 1 is comprised of a cell for fuel cell of a concurrent flow type. That is, the inlet of the fuel gas passage 10 and the inlet of the oxidizing gas passage 20 adjoin each other, the outlet of the fuel gas passage 10 and the outlet of the oxidizing gas passage 20 adjoin each other, and therefore the fuel gas and oxidizing gas flow inside the cell 1 substantially in parallel and in the same direction as each other. In still another embodiment, the cell 1 is comprised of a cell for fuel cell of a perpendicular flow type. That is, the fuel gas and oxidizing gas flow inside the cell 1 substantially perpendicular to each other.

Further, referring to FIG. 1, at an inlet of the cooling water passage 30, one end of a cooling water feed path 31 is connected. At an outlet of the cooling water feed path 31, the other end of the cooling water feed path 31 is connected. Inside the cooling water feed path 31, a cooling water pump 32 for pumping out cooling water and a radiator 33 are arranged. The cooling water feed path 31 upstream of the radiator 33 and the cooling water feed path 31 between the radiator 33 and the cooling water pump 32 are connected with each other by a radiator bypass passage 34. Further, a radiator bypass control valve 35 which controls an amount of cooling water which flows through the inside of the radiator bypass passage 34 is provided. In the fuel cell system A which is shown in FIG. 1, the radiator bypass control valve 35 is comprised of a three-way valve and is arranged at an inlet of the radiator bypass passage 34. When the cooling water pump 32 is driven, the cooling water which is discharged from the cooling water pump 32 flows through the cooling water feed path 31 to the cooling water passage 30 in the cell 1, then passes through the cooling water passage 30 to flow into the cooling water feed path 31 and passes through the radiator 33 or radiator bypass passage 34 to be returned to the cooling water pump 32. In this case, if an amount of the cooling water which is sent by the radiator bypass control valve 35 to the radiator 33 is increased, a cooling water temperature is lowered and therefore a temperature of the cell 1 is lowered. Alternatively, if the amount of cooling water which is discharged from the cooling water pump 32 is increased, the temperature of the cell 1 is lowered. In this way, the cooling water feed path 31, cooling water pump 32, and radiator bypass control valve 35 act as a fuel cell temperature controller which controls the fuel cell temperature.

The electronic control unit 50 is comprised of a digital computer which is provided with components which are connected with each other by a bidirectional bus 51 such as a RPM (read only memory) 52, RAM (random access memory) 53, CPU (microprocessor) 54, input port 55, and output port 56. At the cooling water feed path 31 which adjoins the cooling water passage 30 in the cell 1, a temperature sensor 40 which detects a temperature of the cooling water is attached. The cooling water temperature which is detected by the temperature sensor 40 expresses a temperature of the cell 1. Further, between the anode 2a and cathode 2c of the cell 1, a voltmeter 41 and electrical resistance meter 42 which respectively detect an output voltage value of the cell 1 and electrical resistance value are provided. The output signals of the temperature sensor 40, voltmeter 41, and electrical resistance meter 42 are input through corresponding AD converters 57 to the input port 55. On the other hand, the output port 56 is connected through corresponding drive circuits 56 through the fuel gas control valve 13, anode off-gas control valve 15, compressor 23, cooling water pump 32, and radiator bypass control valve 35.

Figure 3:
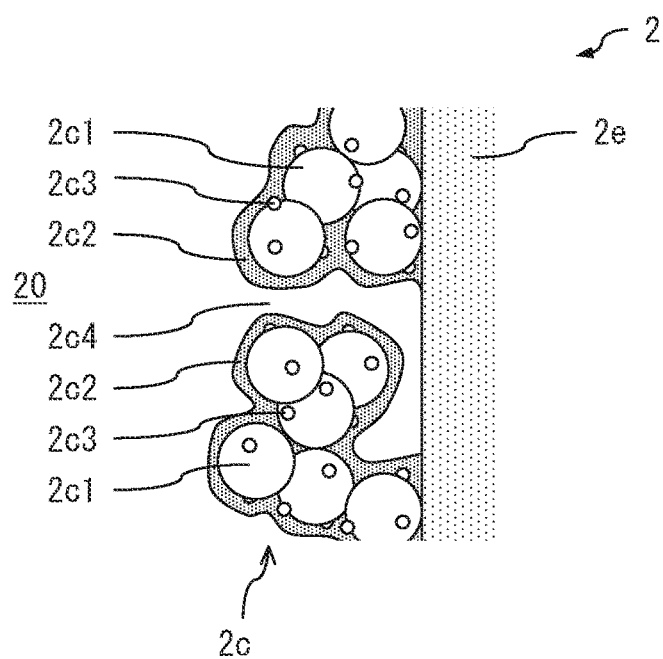
FIG. 3 is a partial enlarged cross-sectional view of a cathode.

FIG. 3 shows a partially enlarged cross-sectional view of the cathode 2c. As shown in FIG. 3, the cathode 2c includes a conductive material 2c1 in a form of particulates, an ionomer 2c2 which covers the conductive material 2c1, and a catalyst 2c3 in a form of particulates which is carried on the conductive material 2c1. Further, in the example which is shown in FIG. 3, the conductive material 2c1 is comprised of carbon, the ionomer 2c2 is comprised of an electrolyte which is the same as or similar to the electrolyte 2e, and the catalyst 2c3 is comprised of platinum. Note that, in FIG. 3, 2c4 shows a clearance which is formed at the cathode 2c.

Now then, if fuel gas is fed into the fuel gas passage 10 in the cell 1 and oxidizing gas is fed into the oxidizing gas passage 20, electrical energy is generated in the cell 1. This generated electrical energy is sent to the electric motor 4 for driving the vehicle. Due to this, the motor 4 is driven. Alternatively, the generated electrical energy is sent to the electric accumulator 6 where it is stored.

In this case, in the cathode 2c, the following electrochemical reaction (1) is performed:

$$O_2 + 4H^+ + 4e^- \rightarrow 2H_2O \tag{1}$$

Figure 4:
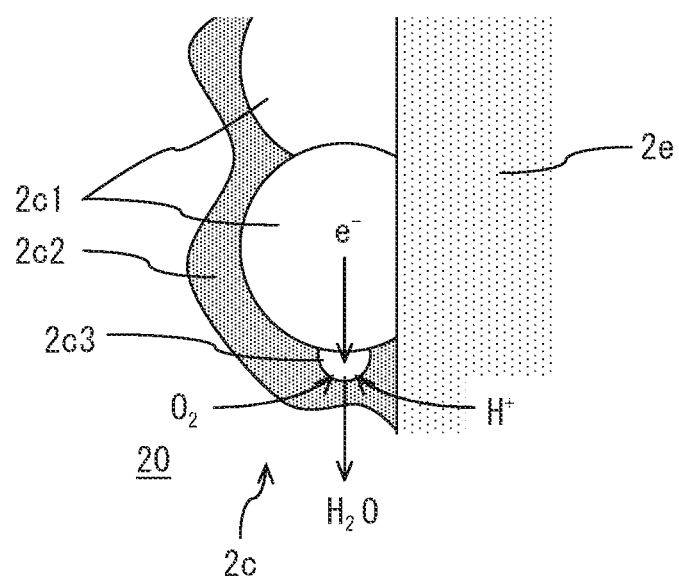
FIG. 4 is a schematic view which explains an electrochemical reaction at a cathode.

That is, as shown in FIG. 4, the hydrogen ions $H^+$ pass through the electrolyte 2e and reach the cathode 2c, in particular a surface of the catalyst 2c3. Further, the oxygen $O_2$ passes through the ionomer 2c2 and reaches the surface of the catalyst 2c3. Alternatively, it passes through the clearance which is formed at the cathode 2c (FIG. 3) and reaches the catalyst 2c3. Furthermore, the electrons $e^-$ are conducted through the conductive material 2c1 and reach the surface of the catalyst 2c3. As a result, the above-mentioned electrochemical reaction (1) occurs and moisture is generated.

In this regard, if the temperature of the cell 1 becomes higher, moistness of the cell 1, in particular the membrane electrode assembly 2 falls due to an increase of an amount of evaporated moisture. If the moistness of the cell 1 falls, a power generation quantity or efficiency of the cell 1 is liable to become lower, as has been known in the past. The present inventors earnestly investigated the mechanism of this phenomenon and learned that an oxygen permeability of the ionomer 2c2 is involved in the drop in the power generation quantity of the cell 1. This will be explained while referring to FIG. 5.

Figure 5:
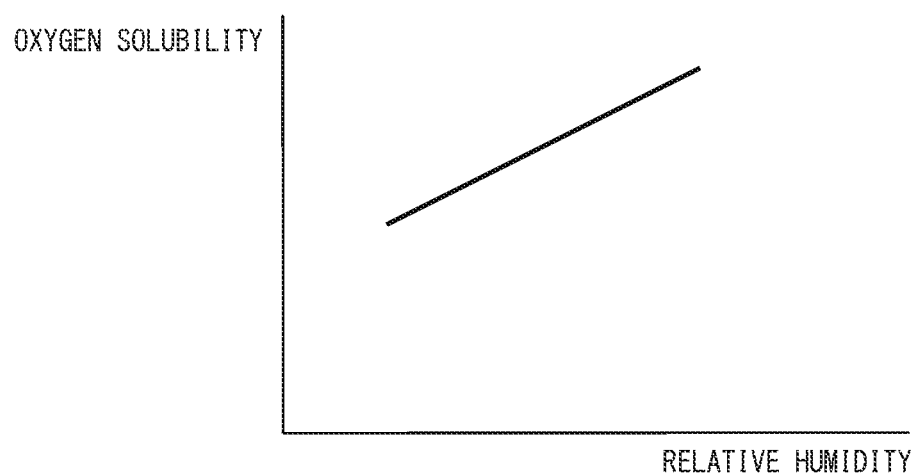
FIG. 5 is a graph which shows an oxygen solubility of an ionomer.

FIG. 5 shows results of experiments which show a relationship between a relative humidity of the atmosphere around an ionomer and an oxygen solubility of the ionomer. This relative humidity expresses moistness of ionomer. As will be understood from FIG. 5, if the relative humidity falls, the oxygen solubility of the ionomer falls. On the other hand, the oxygen permeability of the ionomer is expressed by a product of the oxygen solubility of the ionomer and an oxygen diffusion coefficient of the ionomer. Therefore, if the moistness of the ionomer falls, the oxygen permeability of the ionomer falls.

If the oxygen permeability of the ionomer falls, an amount of oxidizing gas or an amount of oxygen which reaches the cathode 2c decreases. As a result, it becomes harder for the above-mentioned electrochemical reaction (1) to proceed and therefore the power generation quantity of the cell 1 is decreased. This is the mechanism behind the decrease in the power generation quantity of the cell which occurs when the moistness of the cell 1 falls.

In accordance with the above, if making the amount of oxidizing gas or the amount of oxygen which passes through the ionomer 2c2 increase or be restored when the moistness of the cell 1 becomes low, the power generation quantity of the cell 1 can be increased or restored. In order to make the amount of oxidizing gas which passes through the ionomer 2c2 increase, it is sufficient to make an amount of oxidizing gas around the cathode 2c increase. For that, it is sufficient to make an amount of oxidizing gas which is sent to the cell 1 or oxidizing gas passage 20 increase.

On the other hand, moistness of the cell 1 is represented by the electrical resistance value of the cell 1. That is, as the moistness of the cell 1 becomes lower, the electrical resistance value of the cell 1 becomes larger.

On the other hand, in normal power generation control, the fuel cell system A is controlled to make an output current value of the cell 1 equal to a target current value which is determined based on a target power generation quantity of the cell 1. Therefore, considering the fact that the power generation quantity of the cell 1 is represented by a product of an output current value and an output voltage value of the cell 1, it can be the that a power generation quantity of the cell 1 when the output voltage value is low is decreased compared with that when the output voltage value is high, under the same output current.

Therefore, in the embodiment according to the present invention, when the output voltage value of the cell 1 is lower than a predetermined threshold voltage value and the electrical resistance value of the cell 1 is higher than a predetermined threshold resistance value, the oxidizing gas feeder 23 is controlled to perform control for increasing an oxidizing gas amount which increases an amount of oxidizing gas sent to the cell 1. As a result, the amount or concentration of oxidizing gas in the oxidizing gas passage 20 is increased and thereby the amount of oxidizing gas which passes through the ionomer and reaches the cathode 2c is increased. Therefore, the power generation quantity of the cell 1 is quickly increased.

The power generation quantity of the cell 1 being increased means that an amount of moisture which is produced by the above-mentioned electrochemical reaction (1) is increased. As a result, moistness of the cell 1 also rises or is restored. If the moistness of the cell 1 raises, the oxygen permeability of the ionomer rises, therefore the power generation quantity of the cell 1 is further increased.

In this regard, another prior art is known where if the moistness of the cell 1 becomes lower, control for decreasing an oxidizing gas amount which decreases an amount of oxidizing gas sent to the cell 1 is performed. In this prior art, an amount of moisture which the cathode off-gas carries off from the cell 1 is decreased, so the moistness of the cell 1 raises and therefore the power generation quantity of the cell 1 is increased or restored. In this regard, if the amount of oxidizing gas is decreased, the amount of oxidizing gas around the cathode 2c is decreased. Therefore, the amount of oxidizing gas which passes through the ionomer and reaches the cathode 2c is further decreased. For this reason, the power generation quantity of the cell 1 is further reduced at the beginning of control for decreasing the oxidizing gas amount and then is increased. That is, in control for decreasing the oxidizing gas amount, a long time is required for making the power generation quantity of the cell 1 increase.

On the other hand, still another prior art is known where if moistness of the cell 1 becomes lower, control for lowering a fuel cell temperature which lowers a temperature of the cell 1 is performed. In the still another prior art, condensation of water vapor is promoted around the cathode 2c of the cell 1, so the moistness of the cell 1 raises and therefore the power generation quantity of the cell 1 is increased or restored. In this regard, if a cooling water temperature of the cell 1 is lowered to perform the control for lowering the fuel cell temperature, a long time is required to lower the temperature of the cell 1. Alternatively, if the temperature of the cell 1 is lowered, it becomes harder for the above-mentioned electrochemical reaction (1) to proceed. Whatever the case, a long time is required for increasing or restoring the power generation quantity of the cell 1.

Figure 6:
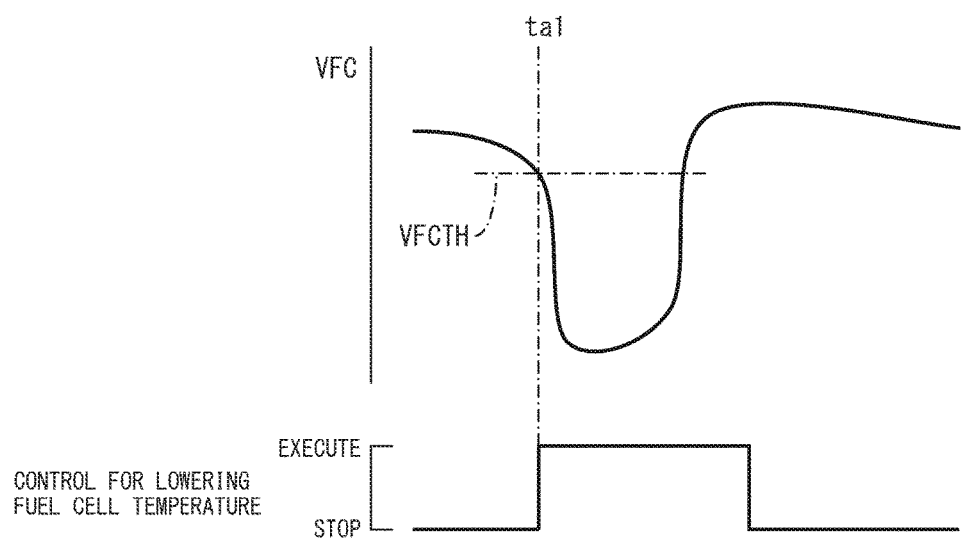
FIG. 6 is a graph which shows a change of an output voltage value of a cell for fuel cell in the prior art.

FIG. 6 shows results of experiments which show an output voltage value VFC of the cell 1 when the above-mentioned control for lowering a fuel cell temperature is performed. In FIG. 6, ta1 shows a time when the output voltage value VFC of the cell 1 becomes lower than a predetermined threshold voltage value VFCTH and the electrical resistance value of the cell 1 becomes higher than a predetermined threshold resistance value. As will be understood from FIG. 6, the output voltage value VFC of the cell 1 continues to fall for a while even after the control for lowering the fuel cell temperature is started, and starts to rise after a while. That is, in this case, a long time is required for increasing or restoring the power generation quantity of the cell 1.

Figure 7:
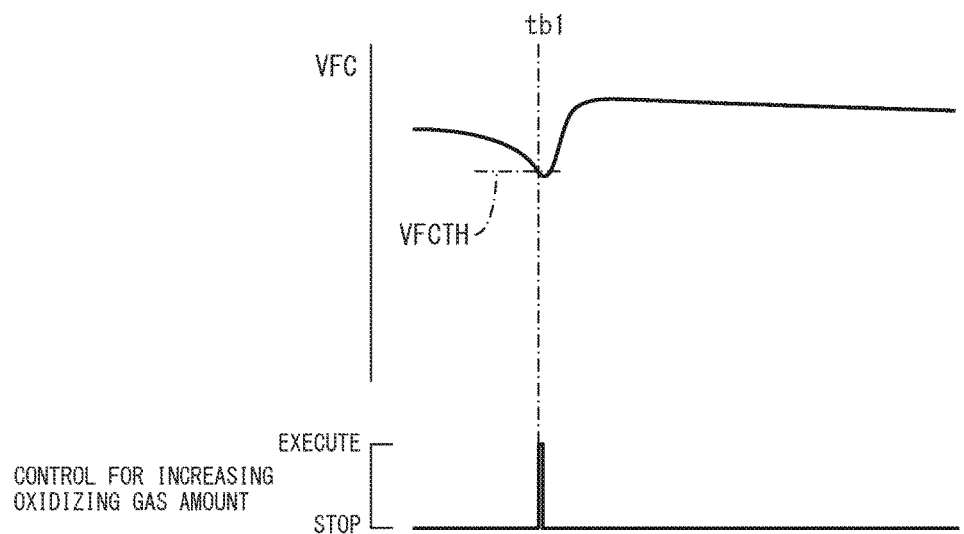
FIG. 7 is a graph which shows a change of output voltage value of a cell for fuel cell of an embodiment according to the present invention.

As opposed to this, FIG. 7 shows results of experiments which show an output voltage value VFC of the cell 1 when control for increasing an oxidizing gas amount is performed. In FIG. 7, tb1 shows a time when the output voltage value VFC of the cell 1 becomes lower than a predetermined threshold voltage value VFCTH and the electrical resistance value of the cell 1 becomes higher than a predetermined threshold resistance value. As will be understood from FIG. 7, if control for increasing the oxidizing gas amount is started, the output voltage value VFC of the cell 1 immediately rises, therefore is restored in a short time.

In actuality, according to experiments of the present inventors, the time required from when the output voltage value VFC becomes lower than the threshold voltage value VFCTH to when it is restored was about 2 minutes in the example of FIG. 6, but was about 1 second in the example of FIG. 7.

Figure 8:
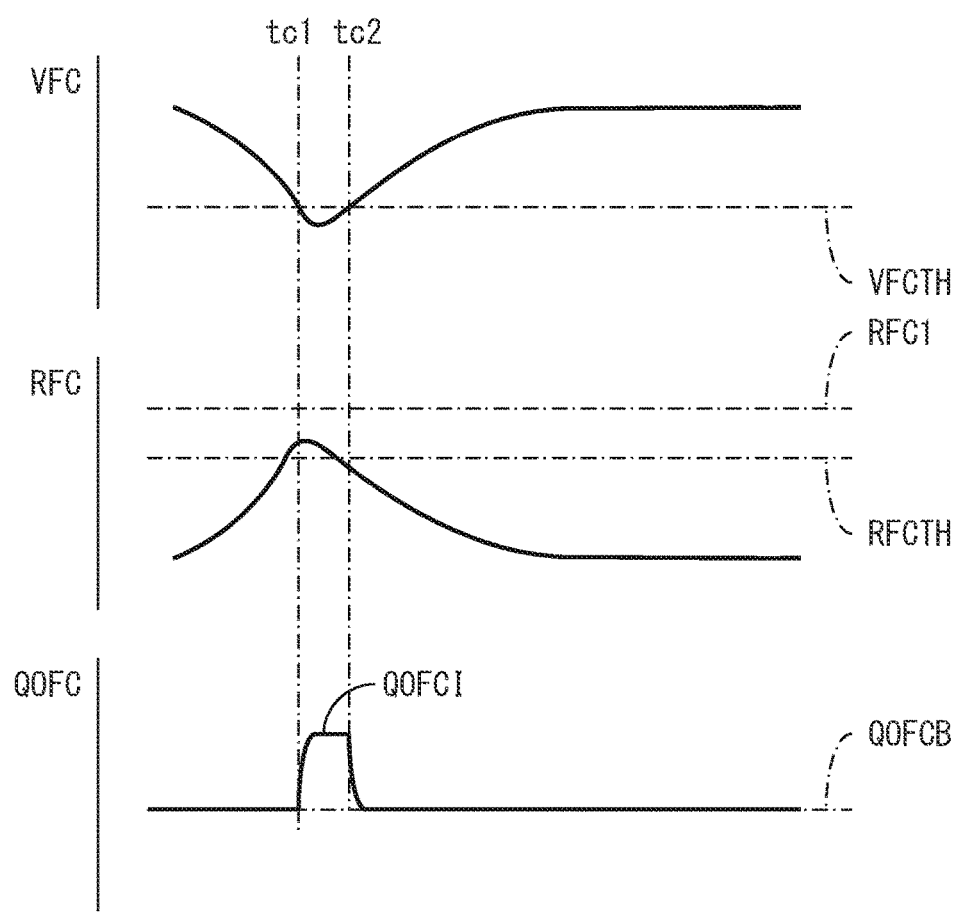
FIG. 8 is a time chart which explains control for restoration.
Figure 9:
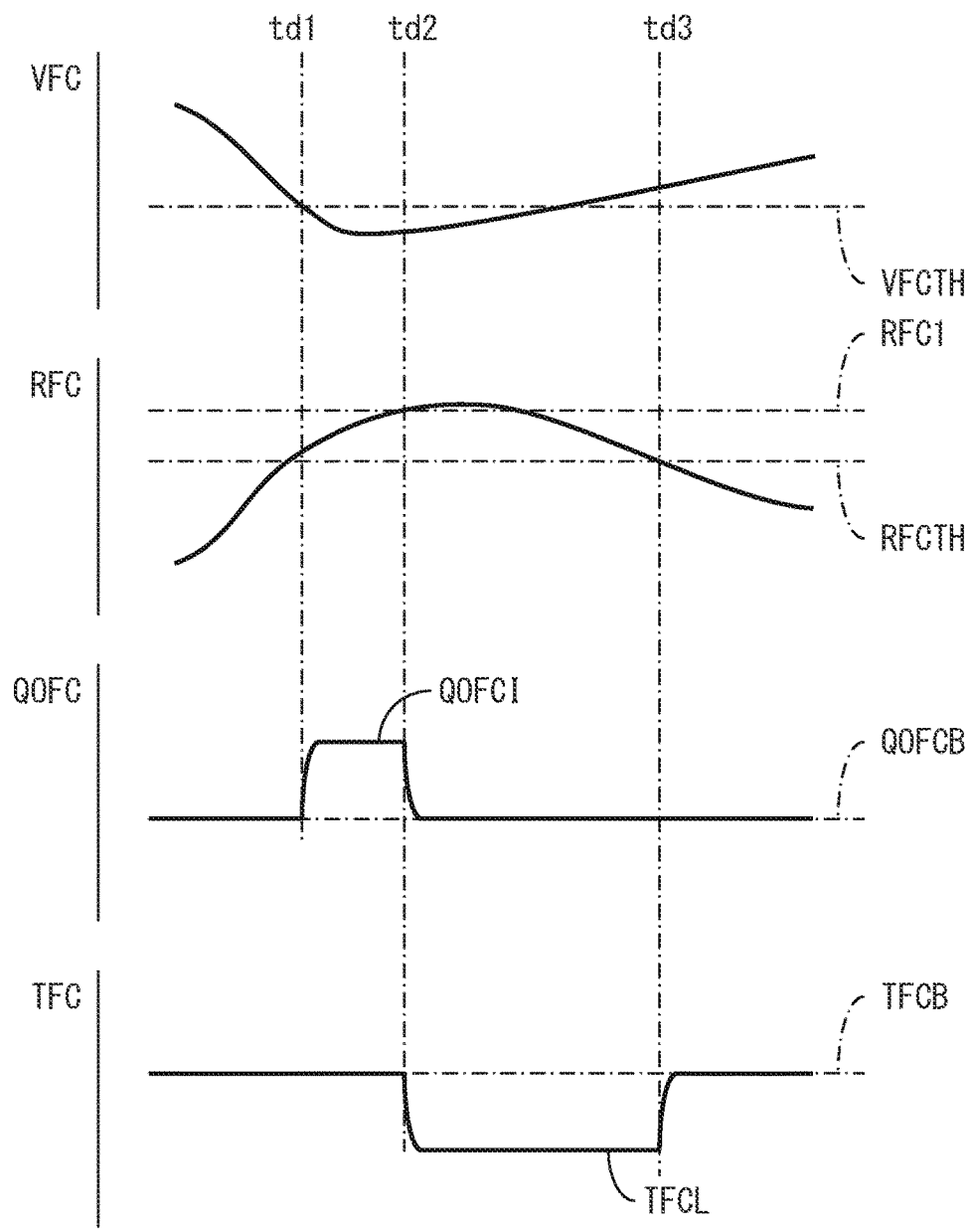
FIG. 9 is a time chart which explains control for restoration.
Figure 10:
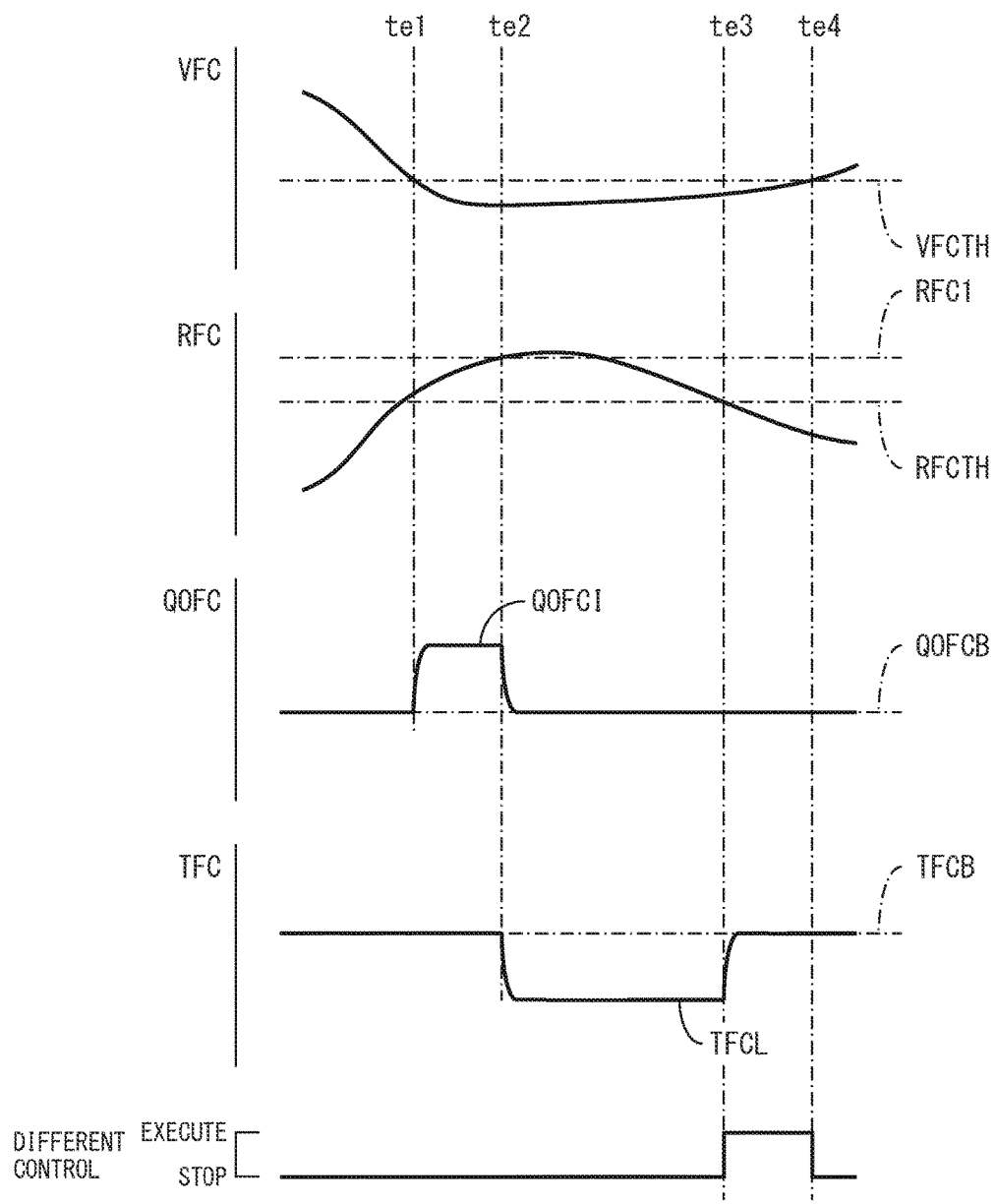
FIG. 10 is a time chart which explains control for restoration.

Next, referring to FIG. 8 to FIG. 10, the embodiment according to the present invention will be further explained. In the example which is shown in FIG. 8, if, at the time tc1, an output voltage value VFC of the cell 1 becomes lower than a predetermined threshold voltage value VFCTH and an electrical resistance value RFC of the cell 1 becomes higher than a predetermined threshold resistance value RFCTH, the above-mentioned control for increasing the oxidizing gas amount is started. As a result, an oxidizing gas amount QOFC which is sent to the cell 1 is increased from a base oxidizing gas amount QOFCB to an increased oxidizing gas amount QOFCI and held there. Note that the base oxidizing gas amount QOFCB is an amount of oxidizing gas at the time of normal control where control for increasing the oxidizing gas amount is not performed and is determined in accordance with, for example, a target power generation quantity of the cell 1.

Next, if, at the time tc2, the output voltage value VFC of the cell 1 becomes equal to or larger than the threshold voltage value VFCTH, that is, if the output voltage value VFC of the cell 1 is restored, the control for increasing the oxidizing gas amount is stopped. As a result, the oxidizing gas amount QOFC which is sent to the cell 1 is returned to the base oxidizing gas amount QOFCB. Note that, in the example which is shown in FIG. 8, at the time tc2, the electrical resistance value RFC of the cell 1 has been lower than the threshold resistance value RFCTH and therefore is restored. That is, in this way, control for increasing the oxidizing gas amount is temporarily performed whereby the output voltage value VFC and electrical resistance value RFC of the cell 1 are restored.

In the example which is shown in FIG. 9, if, at the time td1, the output voltage value VFC of the cell 1 becomes lower than the threshold voltage value VFCTH and the electrical resistance value RFC of the cell 1 becomes higher than the threshold resistance value RFCTH, the above-mentioned control for increasing the oxidizing gas amount is started. Next, if, at the time td2, the electrical resistance value RFC becomes higher than a predetermined upper limit resistance value RFC1, the control for increasing the oxidizing gas amount is stopped. As a result, the oxidizing gas amount QOFC which is sent to the cell 1 is returned to the base oxidizing gas amount QOFCB. Further, at the time td2, control for lowering the fuel cell temperature which lowers the temperature of the cell 1 is started. As a result, the temperature TFC of the cell 1 falls from a base fuel cell temperature TFCB to a lowered fuel cell temperature TFCBL and is held there. Note that the base fuel cell temperature TFCB is a fuel cell temperature at the time of normal control where the control for lowering the fuel cell temperature is not performed and is controlled so as not to exceed, for example, a certain value. Further, the control for lowering the fuel cell temperature is performed using one or both of lowering the temperature of the cooling water and increasing the amount of cooling water.

If control for increasing the oxidizing gas amount is performed, the amount of moisture which the cathode off-gas carries off from the cell 1 is liable to increase and the electrical resistance value RFC of the cell 1 is liable to become excessively higher. Therefore, in the example which is shown in FIG. 9, if the electrical resistance value RFC becomes higher than the upper limit resistance value RFC1 during control for increasing the oxidizing gas amount, the control for increasing the oxidizing gas amount is stopped. As a result, the electrical resistance value RFC can be prevented from becoming excessively high. On the other hand, it is still necessary to restore the output voltage value VFC. Therefore, in the example which is shown in FIG. 9, if control for increasing the oxidizing gas amount is stopped due to the electrical resistance value RFC of the cell 1 becoming higher than the upper limit resistance value RFC1, the control for lowering the fuel cell temperature is performed. As a result, the output voltage value VFC gradually rises and the electrical resistance value RFC gradually falls.

Next, if, at the time td3, the output voltage value VFC of the cell 1 is equal to or larger than the threshold voltage value VFCTH and the electrical resistance value RFC of the cell 1 is equal to or smaller than the threshold resistance value RFCTH, that is, the output voltage value VFC and electrical resistance value RFC of the cell 1 are both restored, the control for lowering the fuel cell temperature is stopped. As a result, the temperature of the cell 1 is returned to the base fuel cell temperature TFCB.

In the example which is shown in FIG. 10, if, at the time te1, the output voltage value VFC of the cell 1 becomes lower than the threshold voltage value VFCTH and the electrical resistance value RFC of the cell 1 becomes higher than the threshold resistance value RFCTH, the above-mentioned control for increasing the oxidizing as amount is started. Next, if, at the time te2, the electrical resistance value RFC becomes higher than the upper limit resistance value RFC1, control for increasing the oxidizing gas amount is stopped and control for lowering the fuel cell temperature is started.

Next, if, at the time te3, the output voltage value VFC of the cell 1 is lower than the threshold voltage value VFCTH while the electrical resistance value RFC of the cell 1 becomes equal to or smaller than the threshold resistance value RFCTH, that is, while the electrical resistance value RFC is restored, different control for making the output voltage value of the cell 1 rise is started. That is, in this case, it is considered that a reason different from the drop in moistness of the cell 1, for example, flooding, causes the output voltage value VFC of the cell 1 to fall. Therefore, in the example which is shown in FIG. 10, different control for eliminating flooding is performed.

Next, if, at the time te4, the output voltage value VFC of the cell 1 becomes equal to or larger than the threshold voltage value VFCTH, that is, if the output voltage value VFC is restored, the above-mentioned different control is stopped.

Note that, in the examples which are shown in FIG. 8 to FIG. 10, the electrical resistance value RFC of the cell 1 becomes higher than the threshold resistance value RFCTH and then the output voltage value VFC of the cell 1 becomes lower than the threshold voltage value VFCTH. In another example, the output voltage value VFC becomes lower than the threshold voltage value VFCTH and then the electrical resistance value RFC becomes higher than the threshold resistance value RFCTH.

The output voltage value of the cell 1 and electrical resistance value depend on the target current value or output current value of the cell 1 and the temperature of the cell 1. In the embodiment according to the present invention, the threshold voltage value VFCTH and the threshold resistance value RFCTH are determined in advance as functions of, for example, the target current value of the cell 1 and the temperature of the cell 1 and are stored in the form of maps in the ROM 52. In this regard, the output voltage value and electrical resistance value of the cell 1 can vary in accordance with the extent of aging of the cell 1. Therefore, in the other embodiment according to the present invention, the threshold voltage value VFCTH and the threshold resistance value RFCTH are corrected by the extent of aging of the cell 1.

Figure 11:
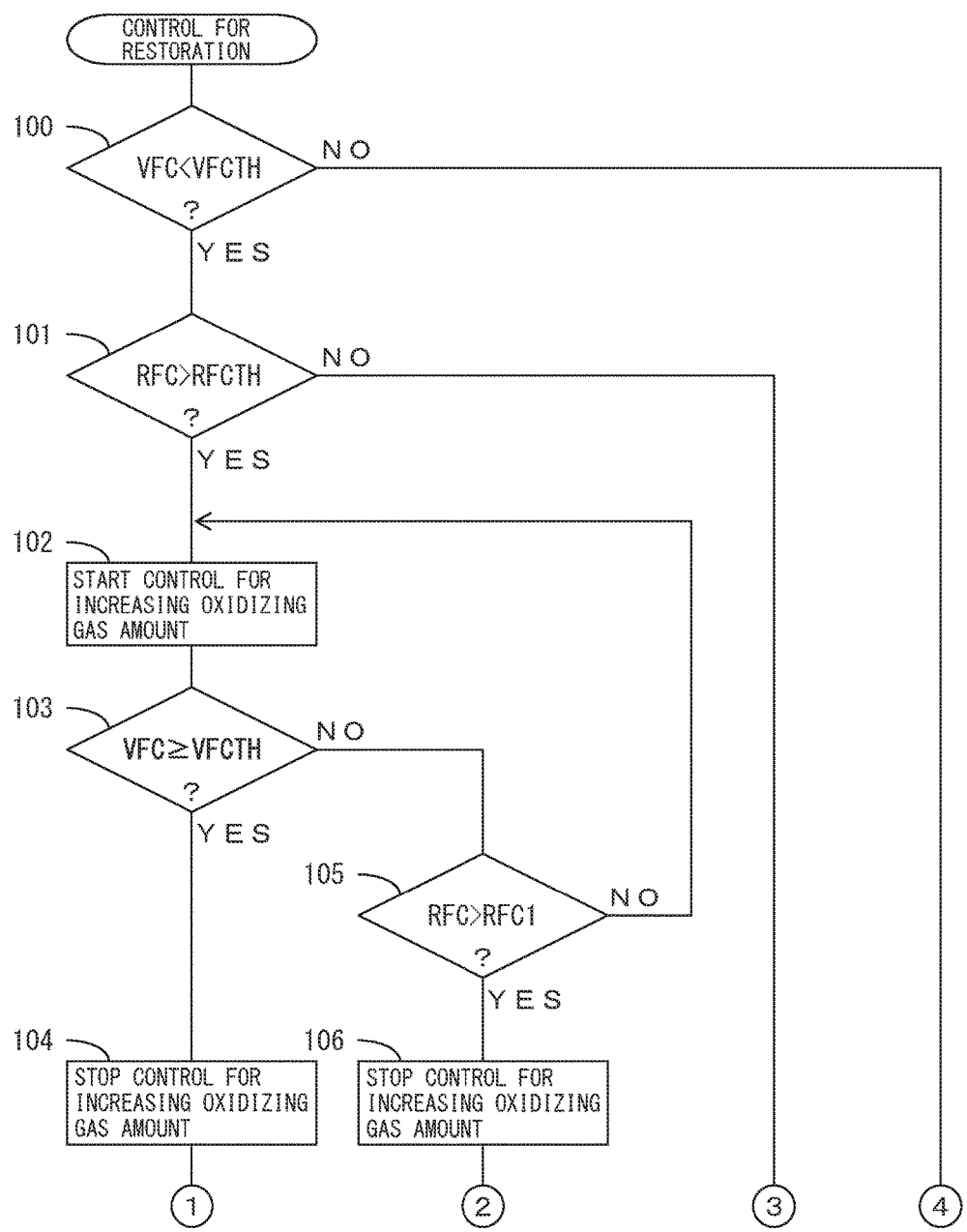
FIG. 11 is a flow chart which shows a routine for performing control for restoration.
Figure 12:
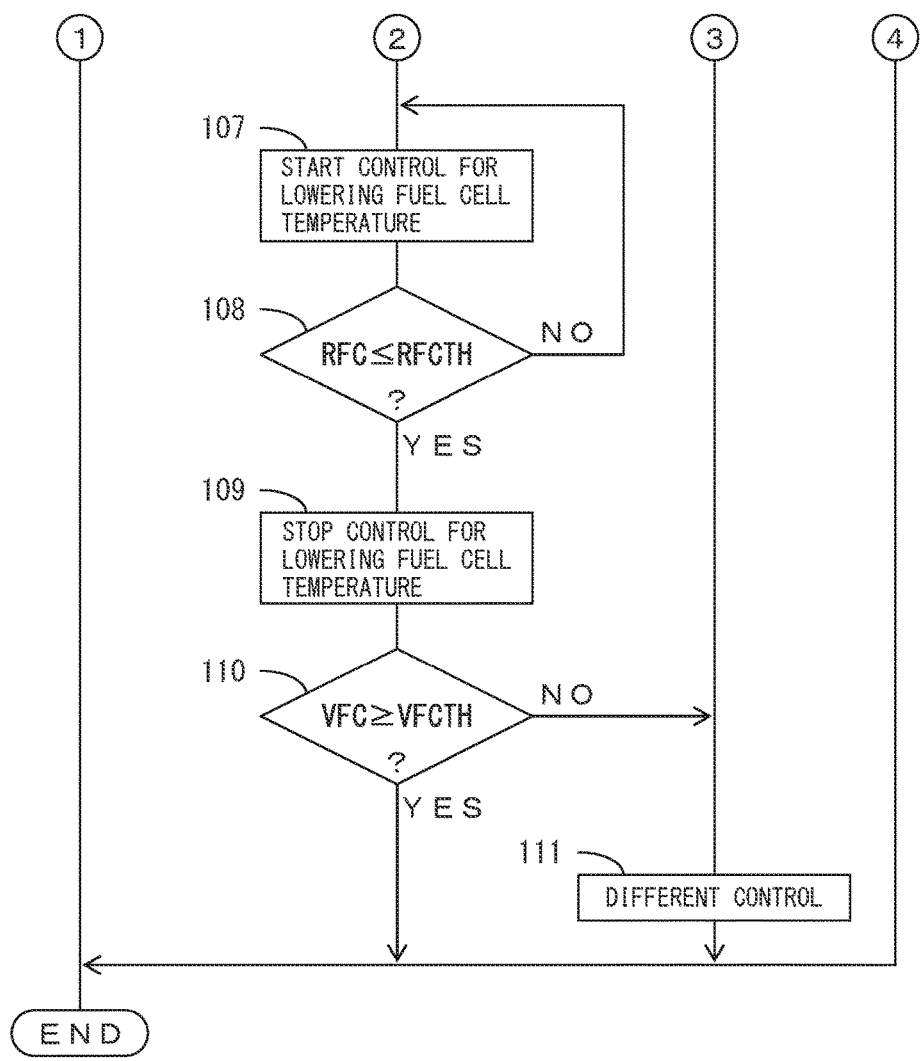
FIG. 12 is a flow chart which shows a routine for performing control for restoration.

FIG. 11 and FIG. 12 show a routine for performing control for restoration of the above-mentioned embodiment according to the present invention. This routine is performed by interruption every certain time. Referring to FIG. 11 and FIG. 12, at step 100, it is judged if the output voltage value VFC of the cell 1 is lower than the threshold voltage value VFCTH. If VFC≥VFCTH, the processing cycle is ended. If VFC<VFCTH, next the routine proceeds to step 101 where it is judged if the electrical resistance value RFC of the cell 1 is higher than the threshold resistance value RFCTH. If RFC>RFCTH, next the routine proceeds to step 102 where control for increasing the oxidizing gas amount is started. At the next step 103, it is judged if the output voltage value VFC of the cell 1 is equal to or larger than the threshold voltage value VFCTH. If VFC≥VFCTH, that is, if the output voltage value VFC is restored, next the routine proceeds to step 104 where control for increasing the oxidizing gas amount is stopped. Next, the processing cycle is ended. As opposed to this, if VFC<VFCTH, that is, if the output voltage value VFC has not yet been restored, the routine proceeds to step 105 where it is judged if the electrical resistance value RFC of the cell 1 is higher than the upper limit resistance value RFC1. If RFC≤RFC1, the routine returns to step 102 where control for increasing the oxidizing gas amount is continued. If RFC>RFC1, next, the routine proceeds to step 106 where control for increasing the oxidizing gas amount is stopped. Next, the routine proceeds to step 107.

At step 107, the control for lowering the fuel cell temperature is started. At the next step 108, it is judged if the electrical resistance value RFC of the cell 1 is equal to or smaller than a threshold resistance value RFCTH. If RFC>RFCTH, that is, if the electrical resistance value RFC has not yet been restored, the routine returns to step 107 where the control for lowering the fuel cell temperature is continued. If RFC≤RFCTH, that is, if the electrical resistance value RFC is restored, next the routine proceeds to step 109 where the control for lowering the fuel cell temperature is stopped. At the next step 110, it is judged if the output voltage value VFC of the cell 1 is equal to or larger than the threshold voltage value VFCTH. If VFC≥VFCTH, the processing cycle is ended. At step 101 and step 110, if VFC<VFCTH, that is, if VFC<VFCTH and RFC≥RFCTH, the routine proceeds to step 111 where the above-mentioned different processing is performed.

Figure 13:
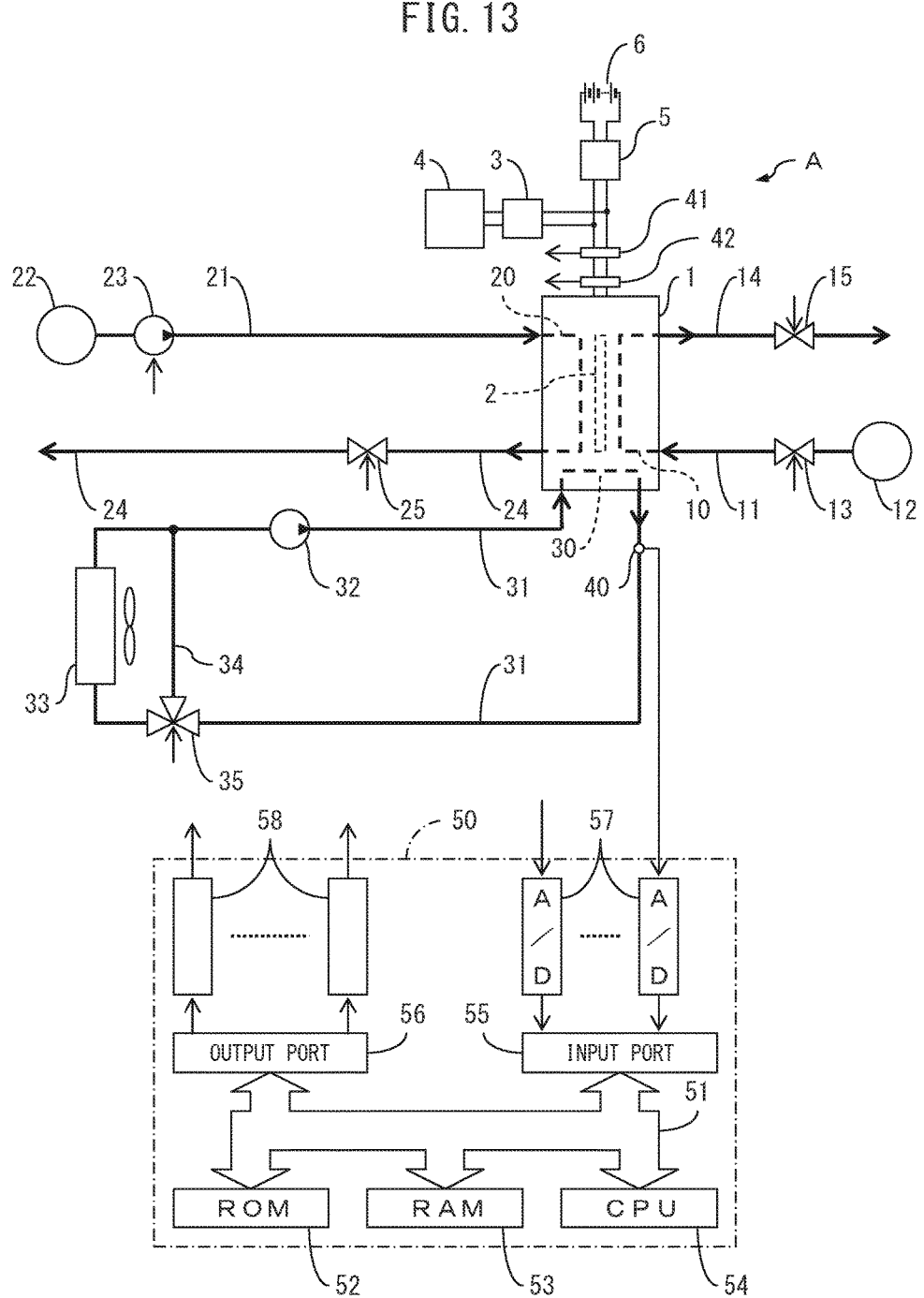
FIG. 13 is an overall view of a fuel cell system A of another embodiment according to the present invention.

FIG. 13 shows another embodiment according to the present invention. In the other embodiment which is shown in FIG. 13, a back pressure control valve 25 which controls a pressure inside the cathode off-gas passage 24, that is, a back pressure of the cell 1, is arranged inside the cathode off-gas passage 24. The back pressure control valve 25 is usually controlled so that the back pressure of the cell 1 is held constant. If an opening degree of the back pressure control valve 25 is made smaller, the back pressure of the cell 1 raises.

In the other embodiment according to the present invention, control for raising a back pressure which rises the back pressure of the cell 1 is performed in addition to the above-mentioned control for increasing the oxidizing gas amount. In this case, the control for raising the back pressure is performed by making the opening degree of the back pressure control valve 25 smaller. If control for increasing the oxidizing gas amount and control for raising the back pressure are performed, the amount or concentration of the oxidizing gas at the cell 1, in particular around the cathode 2c, is further increased. As a result, it is possible to further quickly increase or restore the power generation quantity of the cell 1.

Figure 14:
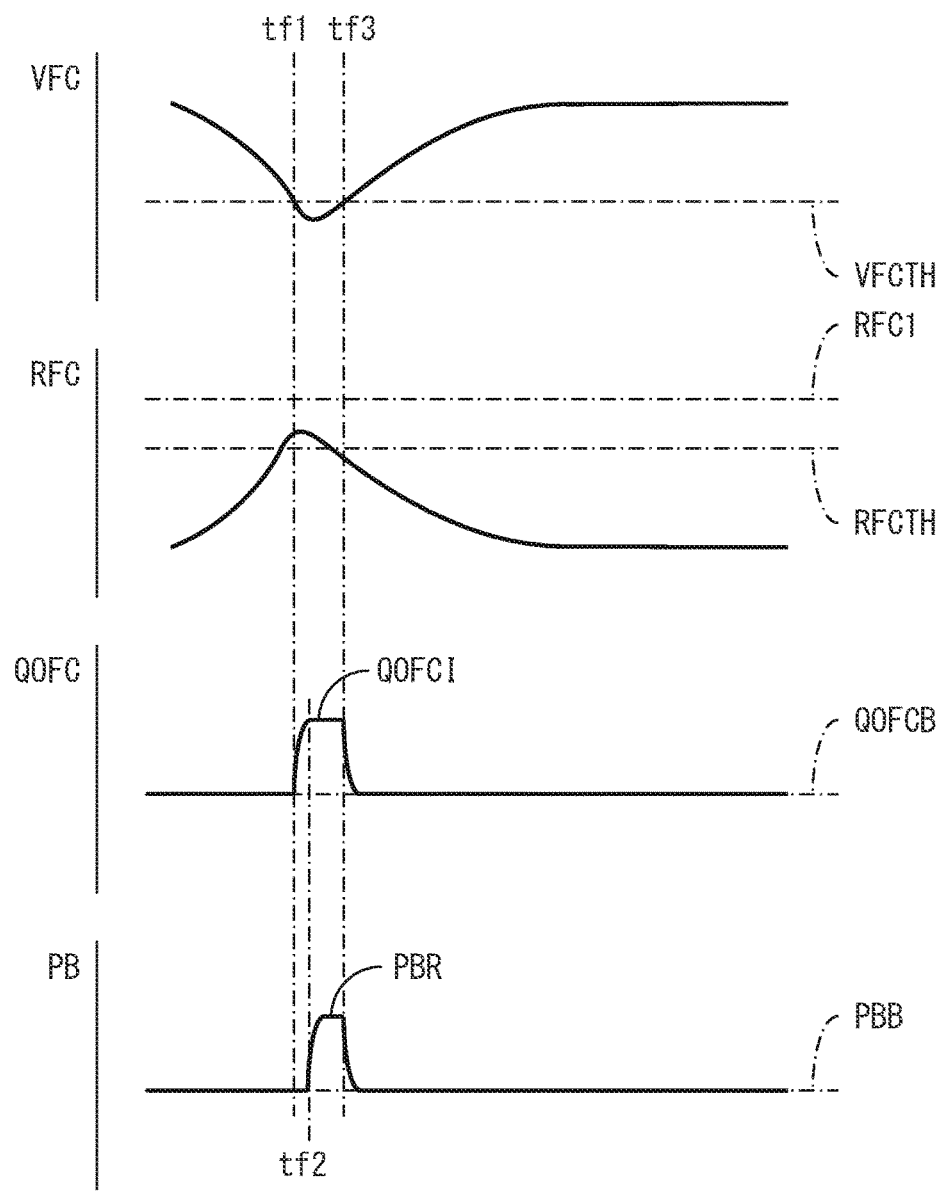
FIG. 14 is a time chart which explains control for restoration of another embodiment according to the present invention.
Figure 15:
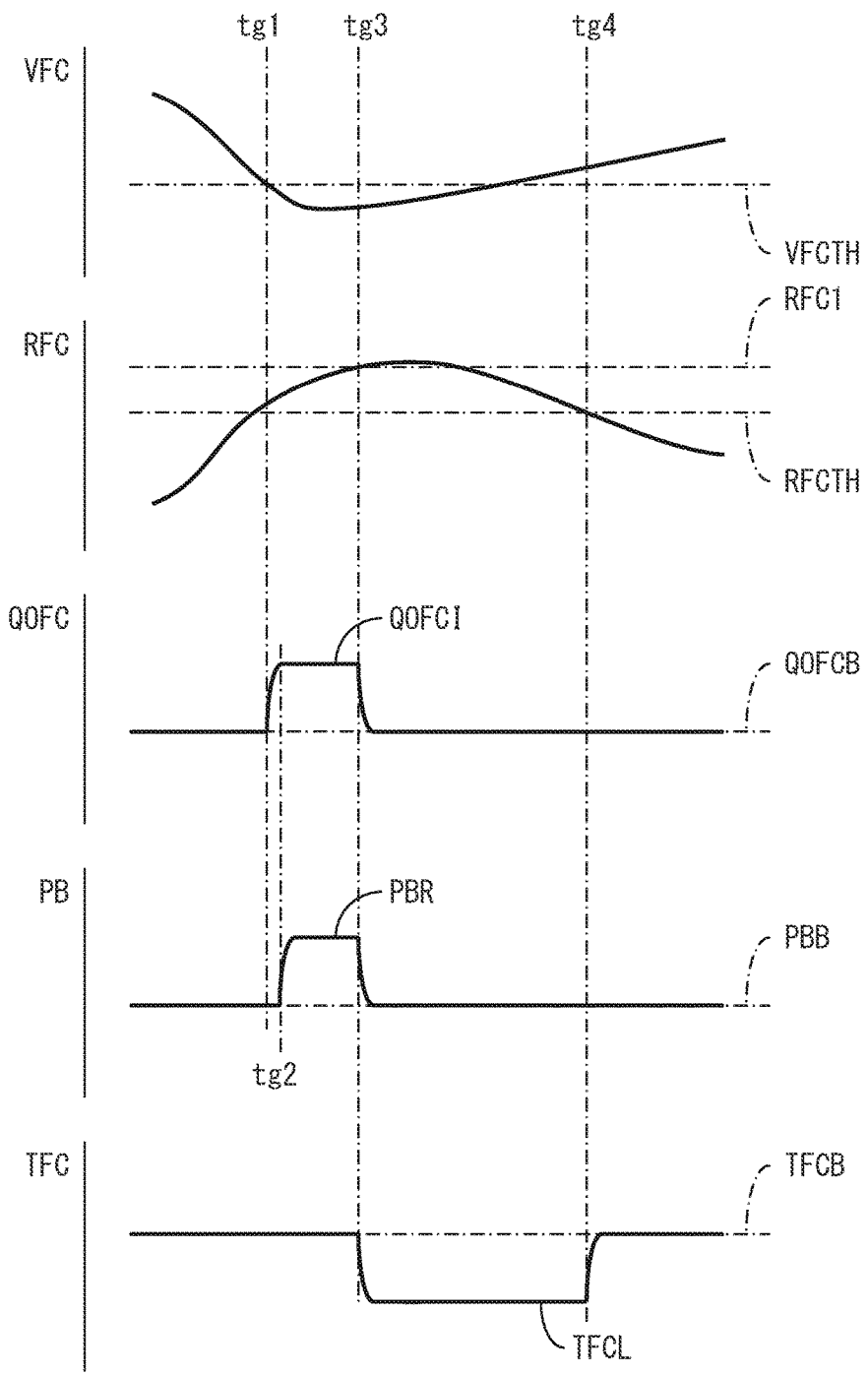
FIG. 15 is a time chart which explains control for restoration of another embodiment according to the present invention.
Figure 16:
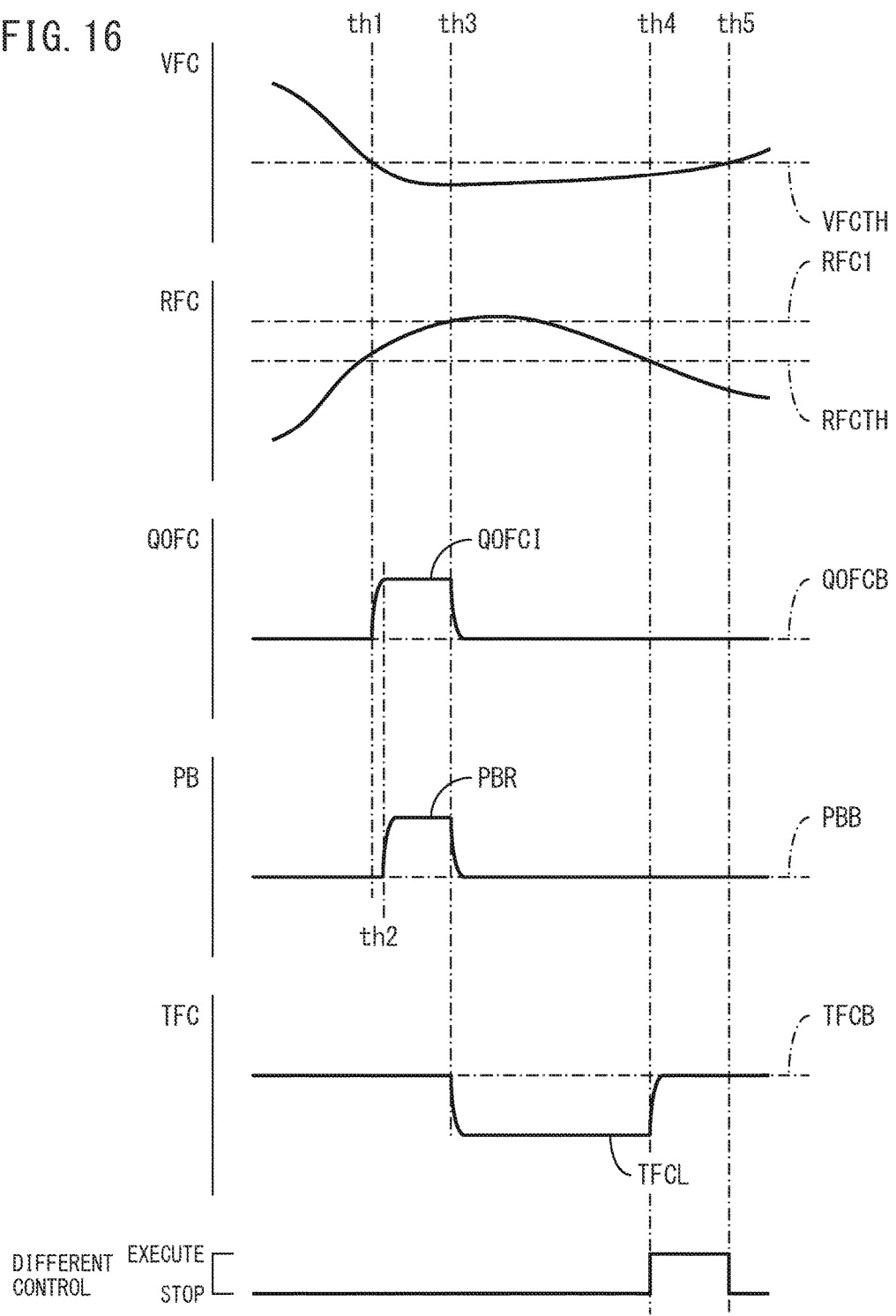
FIG. 16 is a time chart which explains control for restoration of another embodiment according to the present invention.

Next, referring to FIG. 14 to FIG. 16, the other embodiment according to the present invention will be further explained. In the example which is shown in FIG. 14, if, at the time tf1, the output voltage value VFC of the cell 1 becomes lower than the predetermined threshold voltage value VFCTH and the electrical resistance value RFC of the cell 1 becomes higher than the predetermined threshold resistance value RFCTH, first, the above-mentioned control for increasing the oxidizing gas amount is started. As a result, the oxidizing gas amount QOFC which is sent to the cell 1 is increased from the base oxidizing gas amount QOFCB.

Next, if, at the time tf2, the oxidizing gas amount QOFC is increased up to the increased oxidizing gas amount QOFCI, control for raising the back pressure is started. As a result, the back pressure PB of the cell 1 is raised from a base back pressure PBB to a raised back pressure PBR and held there. If control for raising the back pressure is performed before the oxidizing gas amount QOFC is increased, the amount of oxidizing gas around the cathode 2c of the cell 1 conversely is liable to decrease. Therefore, in the example which is shown in FIG. 14, control for raising the back pressure is started after the oxidizing gas amount QOFC is increased. Note that the base back pressure PBB is a back pressure at the time of normal control where control for raising the back pressure is not performed and is determined in accordance with an amount of oxidizing gas from the compressor 23.

Next, if, at the time tf3, the output voltage value VFC of the cell 1 becomes equal to or larger than the threshold voltage value VFCTH, that is, if the output voltage value VFC of the cell 1 is restored, the control for increasing the oxidizing gas amount and the control for raising the back pressure are stopped. As a result, the oxidizing gas amount QOFC which is sent to the cell 1 is returned to the base oxidizing gas amount QOFCB and the back pressure PB of the cell 1 is returned to the base back pressure PBB. Note that, in the example which is shown in FIG. 14, at the time tf3, the electrical resistance value RFC of the cell 1 is lower than the threshold resistance value RFCTH and therefore is restored.

In the example which is shown in FIG. 15, if, at the time tg1, the output voltage value VFC of the cell 1 becomes lower than the threshold voltage value VFCTH and the electrical resistance value RFC of the cell 1 becomes higher than the threshold resistance value RFCTH, the above-mentioned control for increasing the oxidizing gas amount is started. Next, if, at the time tg2, the oxidizing gas amount QOFC is increased up to the increased oxidizing gas amount QOFCI, control for raising the back pressure is started. Next, if, at the time tg3, the electrical resistance value RFC becomes higher than the predetermined upper limit resistance value RFC1, control for increasing the oxidizing gas amount and control for raising the back pressure are stopped. As a result, the oxidizing gas amount QOFC which is sent to the cell 1 is returned to the base oxidizing gas amount QOFCB, and the back pressure PB of the cell 1 is returned to the base back pressure PBB. Further, at the time tg3, the control for lowering the fuel cell temperature is started. As a result, the temperature TFC of the cell 1 is lowered from the base fuel cell temperature TFCB to the lowered fuel cell temperature TFCBL and held there. As a result, the output voltage value VFC gradually rises and the electrical resistance value RFC gradually falls.

Next, if, at the time tg4, the output voltage value VFC of the cell 1 becomes equal to or larger than the threshold voltage value VFCTH and the electrical resistance value RFC of the cell 1 becomes equal to or smaller than the threshold resistance value RFCTH, that is, if the output voltage value VFC of the cell 1 and electrical resistance value RFC are both restored, the control for lowering the fuel cell temperature is stopped. As a result, the temperature of the cell 1 is returned to the base fuel cell temperature TFCB.

In the example which is shown in FIG. 16, if, at the time th1, the output voltage value VFC of the cell 1 becomes lower than the threshold voltage value VFCTH and the electrical resistance value RFC of the cell 1 becomes higher than the threshold resistance value RFCTH, the above-mentioned control for increasing the oxidizing gas amount is started. Next, if, at the time th2, the oxidizing gas amount QOFC is increased up to the increased oxidizing gas amount QOFCI, control for raising the back pressure is started. Next, if, at the time th3, the electrical resistance value RFC becomes higher than the upper limit resistance value RFC1, control for increasing the oxidizing gas amount and control for raising the back pressure are stopped and control for lowering the fuel cell temperature is started.

Next, if, at the time th4, the output voltage value VFC of the cell 1 is lower than the threshold voltage value VFCTH while the electrical resistance value RFC of the cell 1 becomes equal to or smaller than the threshold resistance value RFCTH, that is, while the electrical resistance value RFC is restored, the above-mentioned different control, such as different control for eliminating flooding, is performed.

Next, if, at the time th5, the output voltage value VFC of the cell 1 becomes equal to or larger than the threshold voltage value VFCTH, that is, if the output voltage value VFC is restored, the above-mentioned different control is stopped.

Figure 17:
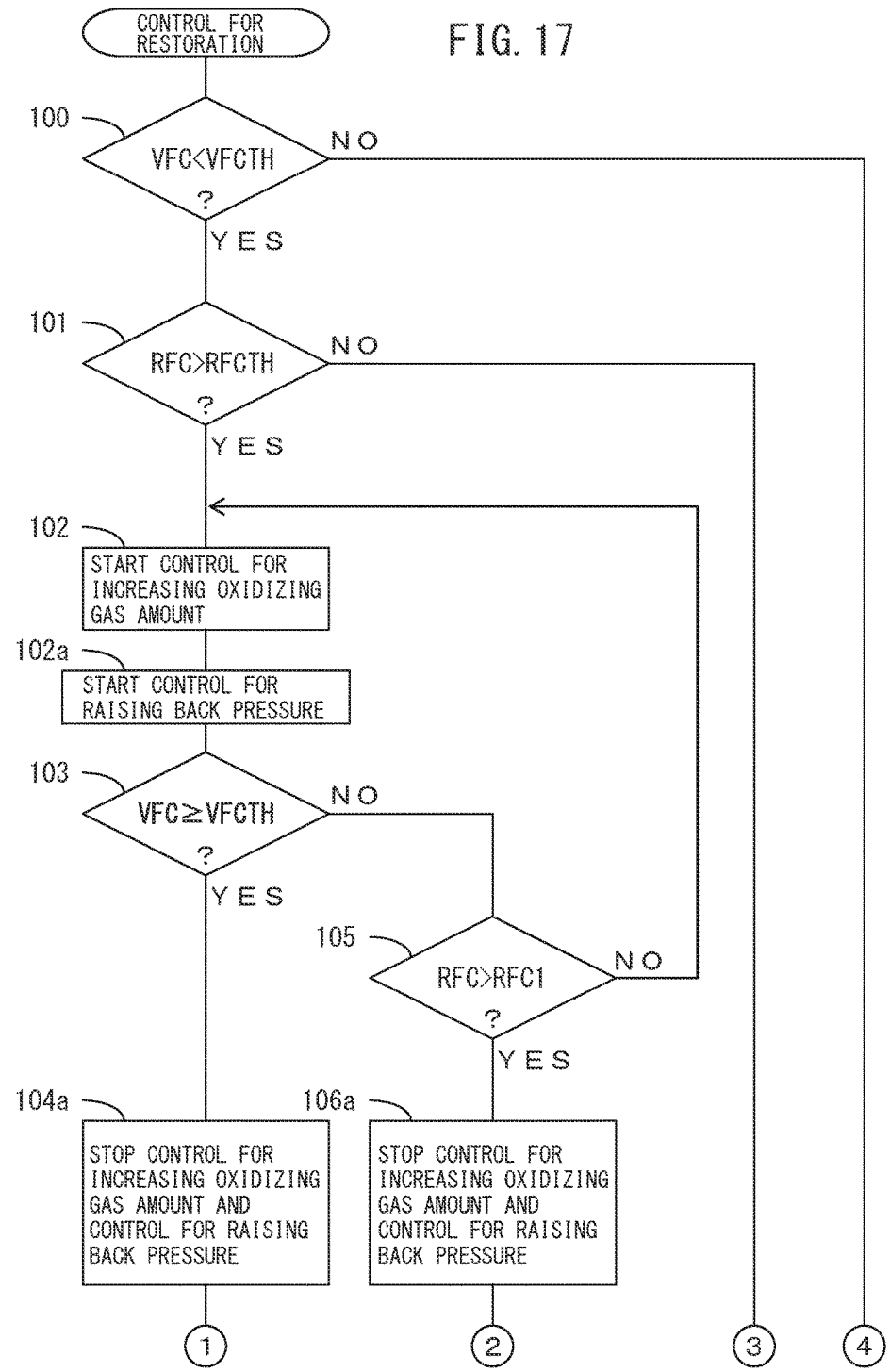
FIG. 17 is a flow chart which shows a routine for performing control for restoration of another embodiment according to the present invention.
Figure 18:
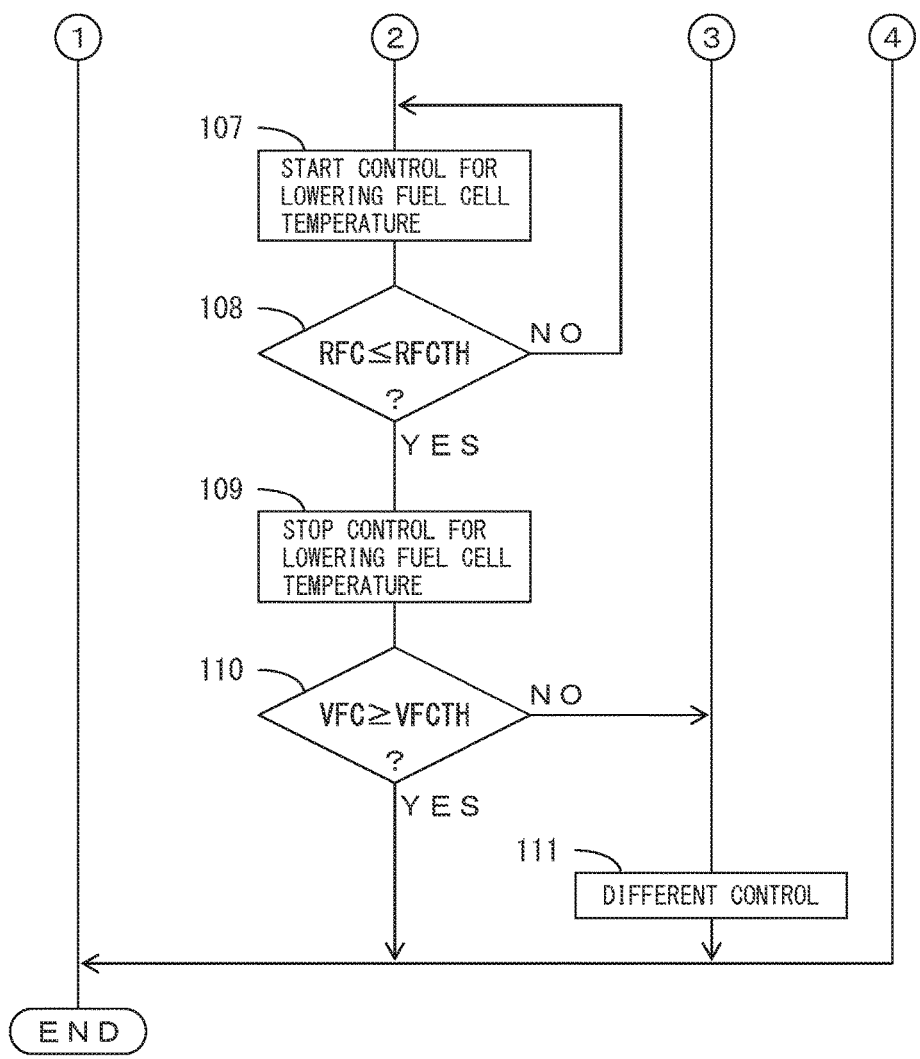
FIG. 18 is a flow chart which shows a routine for performing control for restoration of another embodiment according to the present invention.

FIG. 17 and FIG. 18 show a routine for performing control for restoration of the above-mentioned other embodiment according to the present invention. This routine is performed by interruption every certain time. Referring to FIG. 17 and FIG. 18, at step 100, it is judged if the output voltage value VFC of the cell 1 is lower than the threshold voltage value VFCTH. If VFC≥VFCTH, the processing cycle is ended. If VFC<VFCTH, next the routine proceeds to step 101 where it is judged if the electrical resistance value RFC of the cell 1 is higher than the threshold resistance value RFCTH. If RFC>RFCTH, next the routine proceeds to step 102 where control for increasing the oxidizing gas amount is started. At the next step 102a, the oxidizing gas amount QOFC is increased up to the increased oxidizing gas amount QOFCI, then control for raising the back pressure is started. At the next step 103, it is judged if the output voltage value VFC of the cell 1 is equal to or larger than the threshold voltage value VFCTH. If VFC≥VFCTH, that is, if the output voltage value VFC is restored, next the routine proceeds to step 104a where control for increasing the oxidizing gas amount and control for raising the back pressure are stopped. Next, the processing cycle is ended. As opposed to this, if VFC<VFCTH, that is, if the output voltage value VFC has still not been restored, the routine proceeds to step 105 where it is judged if the electrical resistance value RFC of the cell 1 is higher than the upper limit resistance value RFC1. If RFC≤RFC1, the routine returns to step 102 where control for increasing the oxidizing gas amount and control for raising the back pressure are continued. If RFC>RFC1, next the routine proceeds to step 106a where control for increasing the oxidizing gas amount and control for raising the back pressure are stopped. Next, the routine proceeds to step 107.

At step 107, the control for lowering the fuel cell temperature is started. At the next step 108, it is judged if the electrical resistance value RFC of the cell 1 is equal to or smaller than the threshold resistance value RFCTH. If RFC>RFCTH, that is, if the electrical resistance value RFC has still not been restored, the routine returns to step 107 where the control for lowering the fuel cell temperature is continued. If RFC≤RFCTH, that is, if the electrical resistance value RFC is restored, next the routine proceeds to step 109 where the control for lowering the fuel cell temperature is stopped. At the next step 110, it is judged if the output voltage value VFC of the cell 1 is equal to or larger than the threshold voltage value VFCTH. If VFC≥VFCTH, the processing cycle is ended. If, at step 101 and step 110, VFC<VFCTH, that is, if VFC<VFCTH and RFC≤RFCTH, the routine proceeds to step 111 where the above-mentioned different processing is performed.

The rest of the configuration and operation of the other embodiment according to the present invention are similar to the configuration and operation of the above-mentioned embodiment according to the present invention, so explanations will be omitted.

Figure 19:
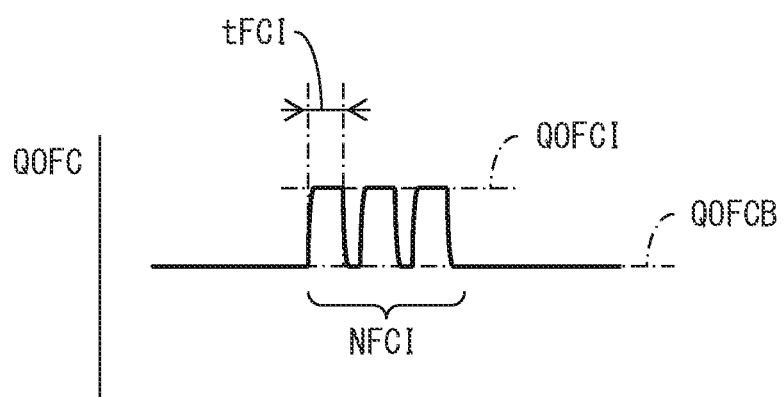
FIG. 19 is a time chart which explains another embodiment of control for increasing an oxidizing gas amount.

In the embodiments of the present invention explained up to here, in the control for increasing the oxidizing gas amount, the oxidizing gas amount QOFC which is sent to the cell 1 is continuously increased. As opposed to this, in the embodiment which is shown in FIG. 19, the oxidizing gas amount QOFC is intermittently increased. That is, the oxidizing gas amount QOFC is increased from the base oxidizing gas amount QOFCB to the increased oxidizing gas amount QOFCI and held there, and is then returned to the base oxidizing gas amount QOFCB if a holding time tFCI elapses. The action of increasing the oxidizing gas amount is performed for the number of times of increase NFCI.

Figure 20:
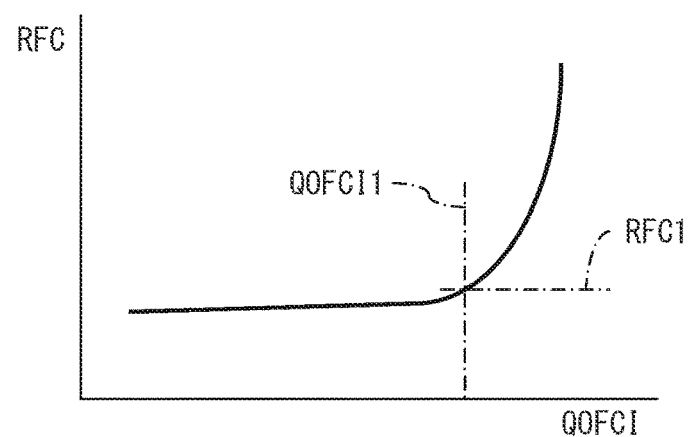
FIG. 20 is a graph which shows a relationship between an increased oxidizing gas amount QOFCI and an electrical resistance value RFC of a cell for fuel cell.

Here, as shown in FIG. 20, if the increased oxidizing gas amount QOFCI becomes greater than an upper limit gas amount QOFCI1, the electrical resistance value RFC of the cell 1 will become higher than the upper limit resistance value RFC1. Therefore, the increased oxidizing gas amount QOFCI is set to be equal to or smaller than the upper limit amount QOFCI1.

Figure 21:
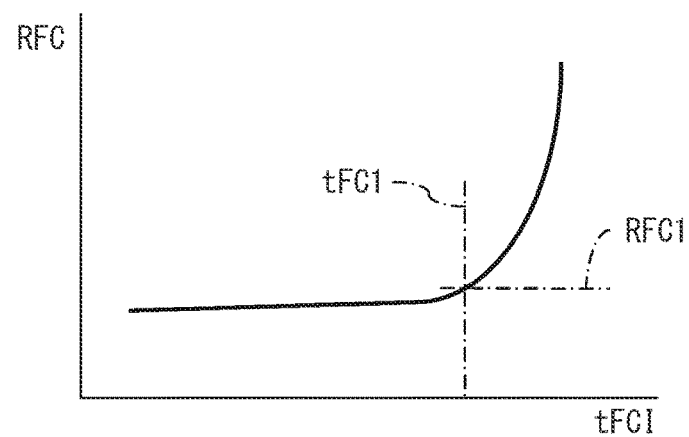
FIG. 21 is a graph which shows a relationship between a holding time tFCI and an electrical resistance value RFC of a cell for fuel cell.

Further, as shown in FIG. 21, if the holding time tFCI becomes longer than an upper limit time tFCI1, the electrical resistance value RFC of the cell 1 becomes higher than the upper limit resistance value RFC1. Therefore, the holding time tFCI is set to be equal to or shorter than the upper limit time tFCI1.

Figure 22:
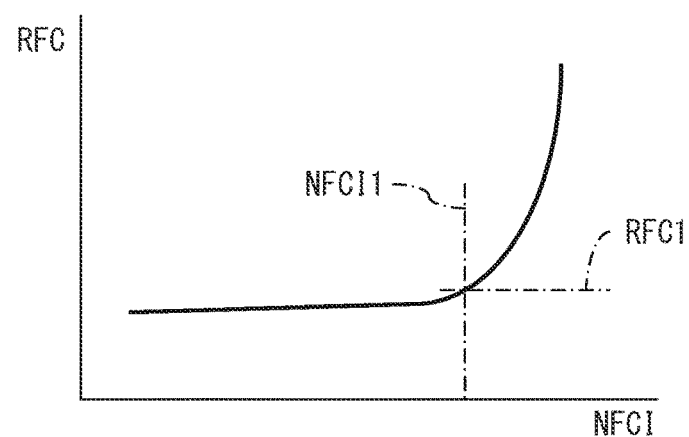
FIG. 22 is a graph which shows a relationship between a number of times of increase NFCI and an electrical resistance value RFC of a cell for fuel cell.

Furthermore, as shown in FIG. 22, if the number of times of increase NFCI becomes greater than an upper limit value NFCI1, the electrical resistance value RFC of the cell 1 becomes higher than the upper limit resistance value RFC1. Therefore, the number of times of increase NFCI is set to be equal to or smaller than the upper limit value NFCI1.

On the other hand, in the embodiments explained up to here, if the electrical resistance value RFC of the cell 1 becomes higher than the upper limit resistance value RFC1 during control for increasing the oxidizing gas amount, the oxidizing gas amount QOFC which is sent to the cell 1 is returned to the base oxidizing gas amount QOFCB. In another embodiment, if the electrical resistance value RFC of the cell 1 becomes higher than the upper limit resistance value RFC1 during control for increasing the oxidizing gas amount, control for decreasing an oxidizing gas is performed to make the oxidizing gas amount QOFC smaller than the base oxidizing gas amount QOFCB. If control for decreasing the oxidizing gas is performed, the amount of moisture which the cathode off-gas carries off from the cell 1 is decreased, so the moistness of the cell 1 is raised.

Next, another embodiment of the fuel cell system A will be explained. The other embodiment of the fuel cell system A is further provided with a recirculation passage which connects the anode off-gas passage 14 upstream of the anode off-gas control valve 15 and the fuel gas feed path 11 downstream of the fuel gas control valve 13 with each other, and an anode off-gas pump which is arranged in the recirculation passage. Part or all of the anode off-gas in the anode off-gas passage 14 is returned by the anode off-gas pump through the recirculation passage to the fuel gas feed path 11.

The anode off-gas contains moisture. Therefore, this moisture is returned to the inside of the cell 1 together with the gas by returning the anode off-gas in the anode off-gas passage 14 to the fuel gas feed path 11 as in the other embodiment of the fuel cell system A. As a result, the moistness of the cell 1 does not easily fall.

As opposed to this, in the fuel cell systems A which are shown in FIG. 1 and FIG. 13, the anode off-gas passage 14 and the fuel gas feed path 11 are not connected with each other. Therefore, the anode off-gas flows through the anode off-gas passage 14 without being returned from the anode off-gas passage 14 to the fuel gas feed path 11. This enables the configuration of the fuel cell system A to simplify and enables the cost lower. In this regard, in this case, the moisture which is contained in the anode off-gas is not returned to the cell 1. For this reason, in the fuel cell systems A which are shown in FIG. 1 and FIG. 13, the moistness of the cell 1 easily falls. Therefore, in the embodiments according to the present invention, control for increasing the oxidizing gas amount is performed if the output voltage value of the cell 1 falls and the moistness of the cell 1 falls. Of course, the present invention can be applied to the above-mentioned other embodiment of the fuel cell system A as well.

What is claimed is:

1. A fuel cell system comprising:
   a fuel cell having a membrane electrode assembly provided with an electrolyte and a cathode and anode respectively arranged at two sides of the electrolyte and an oxidizing gas passage configured to feed an oxidizing gas to the cathode, the cathode including a conductive material, catalyst, and ionomer which covers the conductive material and catalyst;
   an oxidizing gas feed path connected to an inlet of the oxidizing gas passage;
   an oxidizing gas feeder arranged in the oxidizing gas feed path and configured to feed oxidizing gas to the cathode; and
   a system controller programmed to control the fuel cell system to make an output current value of the fuel cell equal to a target current value which is determined based on a target power generation quantity of the fuel cell, and programmed to, after an output voltage value of the fuel cell is becomes lower than a predetermined threshold voltage value and an electrical resistance value of the fuel cell is becomes higher than a predetermined threshold resistance value, control the oxidizing gas feeder to perform control for increasing an oxidizing gas amount which increases an amount of oxidizing gas sent to the fuel cell.

2. The fuel cell system according to claim 1, wherein the system controller is programmed to stop the control for increasing the oxidizing gas amount if the output voltage value of the cell becomes higher than the threshold voltage value during the control for increasing the oxidizing gas amount.

3. The fuel cell system according to claim 1, wherein the system controller is programmed to stop the control for increasing the oxidizing gas amount if the electrical resistance value of the cell becomes higher than a predetermined upper limit resistance value during the control for increasing the oxidizing gas amount.

4. The fuel cell system according to claim 3, further comprising a fuel cell temperature controller configured to control a temperature of the cell, wherein the system controller is programmed to control the fuel cell temperature controller to perform control for lowering a fuel cell temperature which lowers the temperature of the cell if the control for increasing the oxidizing gas amount is stopped due to the electrical resistance value of the cell becoming higher than the upper limit resistance value.

5. The fuel cell system according to claim 4, wherein the system controller is programmed to stop the control for lowering the fuel cell temperature if the electrical resistance value of the cell becomes lower than the threshold resistance value during the control for lowering the fuel cell temperature.

6. The fuel cell system according to claim 1, further comprising a cathode off-gas passage connected to an outlet of the oxidizing gas passage of the cell and a back pressure control valve arranged in the cathode off-gas passage and configured to control a back pressure of the cell, wherein the system controller is programmed to perform the control for increasing the oxidizing gas amount and to control the back pressure control valve to perform control for raising a back pressure which rises the back pressure of the cell if the output voltage value of the cell is lower than the predetermined threshold voltage value and the electrical resistance value of the cell is higher than the predetermined threshold resistance value.

7. The fuel cell system according to claim 6, wherein the system controller is programmed to, when performing the control for increasing the oxidizing gas amount and the control for raising the back pressure, perform first the control for increasing the oxidizing gas amount to increase and maintain an amount of the oxidizing gas up to a predetermined target amount, and then perform the control for raising the back pressure.

8. The fuel cell system according to claim 1, wherein the system controller is programmed to increase the amount of oxidizing gas intermittently in the control for increasing the oxidizing gas amount.

9. The fuel cell system according to claim 1, wherein the cell further has a fuel gas passage configured to feed fuel gas to the anode, wherein the fuel cell system further comprises a fuel gas feed path connected to an inlet of the fuel gas passage and an anode off-gas passage connected to an outlet of the fuel gas passage, and wherein an anode off-gas flows through the anode off-gas passage without being returned from the anode off-gas passage to the fuel gas feed path.

* * * * *